3,661,922
PROCESS FOR PURIFICATION OF VINYL OXAZOLINES
John A. Frump and Wallace F. Runge, Terre Haute, Ind., assignors to Commercial Solvents Corporation
No Drawing. Filed June 15, 1970, Ser. No. 46,496
Int. Cl. C07d 85/36
U.S. Cl. 260—307 F    5 Claims

ABSTRACT OF THE DISCLOSURE

A process for the separation of a mixture of a vinyl oxazoline containing the corresponding oxazoline as an impurity of the steps of reacting the oxazoline with formaldehyde to form the water-soluble 2-alkyl or alkenyl-[1,1-bis(hydroxymethyl)] derivative, then separating it by extraction with water.

BACKGROUND OF THE INVENTION

This invention relates to a process for the purification of vinyl oxazolines. In a particular aspect, this invention relates to a process for separating unreacted oxazolines from vinyl oxazolines.

It is known from W. A. Jordan et al., U.S. Pat. 2,559,440 and from R. F. Purcell, U.S. Pat. 3,248,397 and others, to prepare vinyl oxazolines and vinyl oxazoline esters. An alkanolamine corresponding to Formula I $$R-\underset{\underset{NH_2}{|}}{\overset{\overset{R}{|}}{C}}-CH_2OH \qquad (I)$$

where R is hydrogen, alkyl or hydroxyalkyl is reacted with a fatty acid corresponding to the formula $$R^1CH_2COOH$$

where $R^1$ is hydrogen, alkyl, or alkenyl to form an oxazoline corresponding to Formula II

$$(II)$$

where $R^2$ and $R^3$ are hydrogen, alkyl, hydroxyalkyl or the group $R^1CH_2COOCH_2$— and can be the same or different. The 2-alkyl or alkenyl oxazoline or oxazoline ester is then condensed with formaldehyde at about 100–125° C. thereby forming the 2-alkyl or alkenyl [1,1-bis-(hydroxymethyl)]derivative which is then heated to about 175–200° C. to form the corresponding vinyl oxazoline:

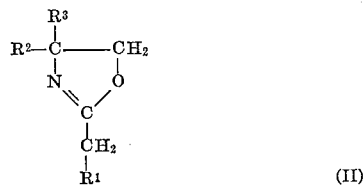

$$(III)$$

These vinyl oxazolines are used in large commercial quantities in protective coatings and other resinous compositions. The lower molecular weight compounds where $R^1$ is alkyl or alkenyl of from 1 to about 8 carbon atoms are especially useful as monomers for copolymerization with ethenylic compounds as disclosed by R. F. Purcell in the aforementioned U.S. patent.

However this process has not been entirely satisfactory because the conversion of the oxazoline to the vinyl oxazoline is incomplete so that the final product usually consists of about 90% or less vinyl oxazoline and about 7% or more of unreacted oxazoline, plus a small fraction of by-products. The unreacted oxazoline is an objectionable component but is difficult to separate. It is a diluent in the copolymerized product and softens the film of protective coatings. It would seem obvious to increase the amount of formaldehyde in an effort to force the reaction to completion. However, this remedy has not been successful due to side reactions, such as condensation and vinylation of ester groups, when present. This plurality of vinyl groups has proven objectionable due to cross-linking, gelling, etc. In general, experience has shown that increasing the ratio of formaldehyde to oxazoline has the practical result of decreasing the yield due to side reactions rather than increasing it.

Accordingly a need has existed to provide a method of separating the unreacted oxazoline from the vinyl oxazoline and thereby improve the performance of the latter product.

SUMMARY OF THE INVENTION

It is an object of this invention to provide a process for the purification of vinyl oxazolines.

It is another object of this invention to provide a process for separating unreacted oxazoline from vinyl oxazoline monomers.

Other objects of this invention will be apparent from the disclosure herein.

A method has been discovered for separating a mixture of a 2-alkyl or alkenyl-2-oxazoline from the corresponding water-immiscible vinyl oxazoline by treating the mixture with formaldehyde at 90–125° C. in an amount sufficient to effect condensation thereof with the oxazoline, thereby converting it to the corresponding water-soluble 2-[1,1-bis(hydroxymethyl)]-2-oxazoline, then separating the latter from the vinyl oxazoline by extracting with water. The term water-immiscible is intended to mean that the vinyl oxazolines generally have poor water solubility by contrast with those which have good water-solubility. Thus, the method is generally applicable to vinyl oxazolines having low water solubility, such as those wherein $R^1$ of the foregoing Formula III is an alkyl or alkenyl group of from 1 to 8 carbon atoms. The formaldehyde condensation products of these oxazolines are sufficiently water-soluble that they can be readily separated, yet the corresponding vinyl compounds are sufficiently insoluble that losses due to solubility are negligible. When the alkyl or alkenyl group at the 2-position of the unreacted oxazoline contains more than about 9 carbon atoms, the formaldehyde condensation products are too insoluble in water to be separated conveniently.

DETAILED DISCUSSION

In the preferred embodiment of the present invention, the unreacted oxazoline content of the impure vinyl oxazoline is determined by any suitable means, many of which are known. Formaldehyde is added thereto in an amount equal to about 2.2 moles per mole of unreacted oxazoline. The mixture is then heated with agitation to within about 90 to about 125° C. for about 1 hour. This step is well known to those skilled in the art. The mixture is then allowed to cool somewhat, e.g. to about 25–75° C., and is then extracted with water to separate the 2-[1,1-bis(hydroxymethyl)] oxazoline, leaving the vinyl oxazoline in a purified state.

The process is especially useful with vinyl oxazoline esters because of their very low water solubility. When the oxazoline contains one or more hydroxymethyl groups in the 4-position, the corresponding vinyl oxazoline tends to be rather water-soluble, especially the lower molecular weight ones, so generally the volume of water used for extraction is kept as low as possible.

In general, the volume of water used for extracting the soluble oxazoline is not critical, nor is the number of extractions. Depending on the end-use of the vinyl oxazoline and the solubility of the axazoline impurity, as little as a single extraction with an equal volume of water may be sufficient. In other instances 3 to 4 extractions using equal or smaller amounts of water may suffice. Generally 2 to 3 extractions produce the separation desired. The selection of the number of extractions and the volume of water therefor is well within the skill of the ordinary artisan without undue experimentation. Thus it is not intended that the extraction step be limited as to the amount of water employed nor as to the number of extractions. Furthermore, it is not intended that the process be limited to a particular extraction method. Many such methods are known in the art, and any of the known methods are suitable, including, for example, countercurrent extraction.

The formaldehyde employed in the practice of this invention can be paraformaldehyde, or preferably the aqueous solution, e.g. the 37% or 44% by weight article of commerce.

The invention will be better understood with reference to the following examples. It is understood that these example are for the purpose of illustration only, and it is not intended that the invention be limited thereby.

EXAMPLE 1

A sample of vinyl oxazoline had the following analysis:

| Component | Percent wt. |
|---|---|
| (A) 2 - isopropenyl - 4 - ethyl-4-propionyloxymethyl - 2 - oxazoline | 90.8 |
| (B) 2 - isopropenyl - 4 - ethyl-4-hydroxymethyl-2 - oxazoline | 1.4 |
| (C) 2,4 - diethyl - 4 - propionyloxymethyl - 2-oxazoline | 6.8 |
| (D) Divinyl oxazoline | 0.5 |
| | 99.5 |

A 4.46 kg. portion containing 300 g. (1.41 moles) of unreacted oxazoline (C) was treated by adding 91% paraformaldehyde, 100 g., in a 2.2:1 mole ratio of formaldehyde per mole of component (C) above. The mixture was heated to 120° C. and was maintained at that temperature for about 30 minutes. The mixture was allowed to cool to about 65° C., then was filtered to separate unreacted paraformaldehyde. The filtrate was extracted three times with an approximately equal volume of distilled water at ambient temperature and the washings were discarded. The residue was transferred to a distillation flask equipped with a distillation column and was distilled at 1 mm. pressure. There was recovered 3875 g. of product for an 87% recovery. It had the following analysis:

| Component | Percent wt. |
|---|---|
| A | 98.3 |
| B | 0.6 |
| C | 0.6 |
| D | 0.5 |

EXAMPLES 2–7

The experiment of Example 1 is repeated in all essential details except that oxazolines are prepared from acids and alkanolamines as given in the table below. The values of $R^1$, $R^2$ and $R^3$ as provided by the acids and alkanolamines are also listed. In Examples 6 and 7, only one mole of acid per mole of alkanolamine is employed so that the resulting oxazolines have hydroxymethyl groups instead of ester groups in the $R^2$ and/or $R^3$ positions.

The oxazolines so prepared are then reacted with formaldehyde by known methods to provide water-immiscible vinyl oxazolines containing unreacted oxazoline starting material. The mixture in each case is again treated with formaldehyde to produce the water-soluble condensation product which is then extracted with water in accordance with Example 1, thereby producing the corresponding vinyl oxazoline in good yield and in a high state of purity.

| Example Number | Acid | Alkanolamine | $R_1$ | $R_2$ | $R_3$ |
|---|---|---|---|---|---|
| 2 | Butyric | 2-amino-2-methyl-1-propanol | $C_2H_5$ | $CH_3$ | $CH_3$ |
| 3 | Caproic | 2-amino-2-methyl-1,3-propanediol | $C_4H_9$ | $CH_3$ | $C_5H_{11}COOCH_2-$ |
| 4 | do | 2-amino-2-hydroxymethyl-1,3-propanediol | $C_5H_{17}$ | $C_9H_{19}COOCH_2-$ | $C_9H_{19}COOCH_2-$ |
| 5 | Propionic | Ethanolamine | $CH_3$ | H | H |
| 6 | Caproic | 2-amino-2-ethyl-1,3-propanediol | $C_4H_9$ | $C_2H_5$ | $-CH_2OH$ |
| 7 | Nonanoic | 2-amino-2-hydroxymethyl-1,3-propanediol | $C_7H_{15}$ | $-CH_2OH$ | $-CH_2OH$ |

We claim:

1. A process for the separation of a mixture of a vinyl oxazoline corresponding to the formula

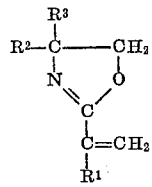

and an oxazoline corresponding to the formula

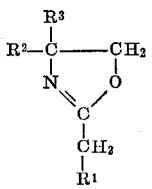

wherein $R^2$ and $R^3$ are hydrogen, alkyl of 1 or 2 carbon atoms, hydroxymethyl or the group $R^1CH_2COOCH_2-$ and can be the same or different, and wherein $R^1$ is an alkyl or alkenyl group of from 1 to 8 carbons, consisting of the steps of reacting said mixture with about 2.2 moles of formaldehyde per mole of said oxazoline at a temperature of about 90 to about 125° C. thereby forming the corresponding 2-alkyl or alkenyl-[1,1-bis(hydroxymethyl)]-2-oxazoline, cooling to within about 25–75° C. and extracting with water to separate said 2-alkyl or alkenyl-[1,1-bis(hydroxymethyl)]-2-oxazoline from said vinyl oxazoline.

2. The process of claim 1 wherein $R^2$ and $R^3$ are hydroxymethyl.

3. The process of claim 1 wherein $R^2$ and $R^3$ are methyl.

4. The process of claim 1 wherein $R^2$ is ethyl and $R^3$ is hydroxymethyl.

5. The process of claim 1 wherein $R^2$ is propionyloxymethyl.

References Cited

UNITED STATES PATENTS 3,523,123  8/1970  Wehrmeister _____ 260—307

ALEX MAZE, Primary Examiner

R. V. RUSH, Assistant Examiner